United States Patent
Namba (10) Patent No.: US 9,096,436 B2
(45) Date of Patent: Aug. 4, 2015

(54) METHOD FOR PRODUCING IONOMER-COATED, CATALYST-SUPPORTING CARBON NANOTUBES

(71) Applicant: TOYOTA JIDOSHA KABUSHIKI KAISHA, Toyota-shi (JP)

(72) Inventor: Ryoichi Namba, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/354,718

(22) PCT Filed: Oct. 31, 2012

(86) PCT No.: PCT/JP2012/078220
§ 371 (c)(1),
(2) Date: Apr. 28, 2014

(87) PCT Pub. No.: WO2013/069521
PCT Pub. Date: May 16, 2013

(65) Prior Publication Data
US 2014/0322453 A1  Oct. 30, 2014

(30) Foreign Application Priority Data
Nov. 7, 2011  (JP) .................................. 2011-243792

(51) Int. Cl.
*C01B 31/02*  (2006.01)
*H01M 4/90*  (2006.01)
*H01M 4/92*  (2006.01)
(Continued)

(52) U.S. Cl.
CPC ............. *C01B 31/0253* (2013.01); *B01J 31/06* (2013.01); *B01J 35/02* (2013.01); *C01B 31/0226* (2013.01); *H01M 4/88* (2013.01); *H01M 4/8892* (2013.01); *H01M 4/9083* (2013.01);
(Continued)

(58) Field of Classification Search
CPC  H01M 4/926; H01M 4/9083; C01B 31/0253; C01B 31/0226
See application file for complete search history.

(56) References Cited

U.S. PATENT DOCUMENTS

| | | | |
|---|---|---|---|
| 2010/0075201 A1 | 3/2010 | Nakanishi et al. |
| 2010/0196801 A1 | 8/2010 | Nakanishi et al. |
| 2010/0330451 A1 | 12/2010 | Shinozaki et al. |

FOREIGN PATENT DOCUMENTS

| | | |
|---|---|---|
| JP | 2004-185930 A | 7/2004 |
| JP | 2005-302434 A | 10/2005 |

(Continued)

*Primary Examiner* — Xiao Zhao
(74) *Attorney, Agent, or Firm* — Kenyon & Kenyon LLP (57) ABSTRACT

Disclosed is a method for producing ionomer-coated, catalyst-supporting carbon nanotubes, the method comprising: a step of preparing catalyst-supporting carbon nanotubes on at least one surface of a substrate; a step of preparing a first ionomer solution; an ionomer coating step of bringing the catalyst-supporting carbon nanotubes into contact with the first ionomer solution and coating the catalyst-supporting carbon nanotubes with the ionomer; and a drying step of drying the ionomer-coated, catalyst-supporting carbon nanotubes, wherein the method comprises an ionomer removal step in which, when the ionomer that is unevenly attached in a thickness direction of a layer comprising the ionomer-coated, catalyst-supporting carbon nanotubes, the ionomer that is relatively largely found in and attached to the tip end of the carbon nanotubes rather than other parts thereof, is removed after the ionomer coating step and before the drying step.

9 Claims, 8 Drawing Sheets

(51) Int. Cl.
*B01J 31/06* (2006.01)
*B01J 35/02* (2006.01)
*H01M 8/10* (2006.01)
*H01M 4/88* (2006.01)

(52) U.S. Cl.
CPC .............. *H01M 4/926* (2013.01); *H01M 8/10* (2013.01); *Y02E 60/50* (2013.01)

(56) References Cited

FOREIGN PATENT DOCUMENTS

| | | |
|---|---|---|
| JP | 2007-257886 A | 10/2007 |
| JP | 2008-288104 A | 11/2008 |
| JP | 2010-267582 A | 11/2010 |
| JP | 2010-272383 A | 12/2010 |
| JP | 2012-218959 A | 11/2012 |
| WO | 2009/001964 A1 | 12/2008 |

Base end ←→ Tip end

METHOD FOR PRODUCING IONOMER-COATED, CATALYST-SUPPORTING CARBON NANOTUBES

CROSS-REFERENCE TO RELATED APPLICATIONS

This is a national phase application based on the PCT International Patent Application No. PCT/JP2012/078220 filed on Oct. 31, 2012, claiming priority to Japanese application No. 2011-243792 filed Nov. 7, 2011, the entire contents of both of which are incorporated herein by reference.

TECHNICAL FIELD

The present invention relates to a method for producing catalyst-supporting carbon nanotubes in which the nanotubes are evenly coated with an ionomer, from the base end to the tip end thereof.

BACKGROUND ART

In fuel cells, a fuel and an oxidant are supplied to two electrically-connected electrodes to electrochemically oxidize the fuel, thereby converting chemical energy directly to electrical energy. Unlike thermal power generation, fuel cells are not limited by the Carnot cycle; therefore, they show high energy conversion efficiency. A fuel cell generally comprise a stack of fuel cells, each having an electrolyte layer sandwiched by a pair of electrodes, that is, a membrane-electrode assembly as the basic structure.

Electrochemical reaction at the anode and cathode of fuel cells is developed by introducing a gas such as fuel gas or oxidant gas into a triple phase boundary (three-phase interface) where the gas is in contact with catalyst particles and a polymer electrolyte, the catalyst particles being supported by a carrier (conductor) and the polymer electrolyte ensuring ion conductive paths.

Electrode reaction at the anode side catalyst layer and the cathode side catalyst layer is active when the amount of the catalyst-supporting by carbon particles (e.g., carbon black) is large, resulting in an increase in power generation performance of batteries. However, catalysts used in fuel cells are noble metals such as platinum, and it is problematic in that there is an increase in fuel cell production cost by increasing the supported catalyst amount.

In a reaction electrode in which a catalyst is supported by carbon particles, there is a loss of electrons between the carbon particles and between a separator and the carbon particles, which functions as a current collector. This electron loss is thought to be a cause of stopping an increase in power generation performance.

A fuel cell has been proposed as a prior art for avoiding such problems with production cost and electron loss, in which carbon nanotubes (hereinafter may be referred to as CNTs) are used in fuel cell electrodes. An electrode using CNTs has a small electrical resistance and when compared to the electrode in which a catalyst is supported by carbon particles, there are advantages such that a loss of electrons is inhibited and there is an increase in power generation efficiency. Also, the electrode using CNTs is advantageous in that the supported expensive noble metal catalyst can be efficiently used for electrode reaction.

Because of such advantages, electrode techniques using CNTs have been increasingly developed. For example, a fuel cell technique is disclosed in Patent Literature 1, the fuel cell comprising an electrolyte membrane and a pair of electrodes at both sides of the electrode membrane, wherein at least one of the electrodes is provided with an electroconductive nano columnar body oriented at an angle of 60° or less with respect to the plane direction of the electrolyte membrane, a catalyst supported by the electroconductive nano columnar body, and an electrolyte resin coating the electroconductive nano columnar body.

CITATION LIST

Patent Literature 1: Japanese Patent Application Laid-Open No. 2007-257886

SUMMARY OF INVENTION

Technical Problem

In Paragraph [0049] of the Description of Patent Literature 1, a step of coating the surface of the catalyst-supporting CNTs with an ionomer is disclosed. However, as a result of studies made by the inventor of the present invention, he has found that coating CNTs evenly with an ionomer is quite difficult only by applying an ionomer solution to the surface of CNTs or immersing CNTs in an ionomer solution by a simple common method.

The present invention was achieved in light of the above circumstances. An object of the present invention is to provide a method for producing catalyst-supporting carbon nanotubes that are evenly coated with an ionomer from the base end to the tip end thereof.

Solution to Problem

The method for producing ionomer-coated, catalyst-supporting carbon nanotubes according to the present invention, comprises: a step of preparing catalyst-supporting carbon nanotubes on at least one surface of a substrate, the nanotubes being aligned approximately perpendicular to the plane direction of the substrate; a step of preparing a first ionomer solution; an ionomer coating step of bringing the catalyst-supporting carbon nanotubes into contact with the first ionomer solution and coating the catalyst-supporting carbon nanotubes with the ionomer; and a drying step of drying the ionomer-coated, catalyst-supporting carbon nanotubes, a process containing a set of steps from the ionomer coating step to the drying step, is performed at least one time, wherein the method comprises an ionomer removal step in which, when the ionomer that is unevenly attached in a thickness direction of a layer comprising the ionomer-coated, catalyst-supporting carbon nanotubes, the ionomer that is relatively largely found in and attached to the tip end of the carbon nanotubes rather than other parts thereof, is removed after the ionomer coating step and before the drying step.

In the present invention, the ionomer removal step can use at least one method selected from the group consisting of a method of using heat, a method of using a gravitational force, a method of using an inertial force, a method of using a wind force, and a method of using a surface tension.

In the present invention, the method of using heat is preferably a method in which the ionomer that is relatively largely found in and attached to the tip end of the carbon nanotubes rather than other parts thereof, is burned off by heating the tip end side of the ionomer-coated, catalyst-supporting carbon nanotubes with at least one heating means selected from the group consisting of laser and heat ray.

In the present invention, the method of using a gravitational force is preferably a method in which the ionomer that is relatively largely found in and attached to the tip end of the carbon nanotubes rather than other parts thereof, is removed by inclining the plane direction of the substrate at an angle θ (0°≤θ<90°) with respect to the vertical direction.

In the present invention, the method of using an inertial force is preferably a method in which the ionomer that is relatively largely found in and attached to the tip end of the carbon nanotubes rather than other parts thereof, is shaken off by at least one selected from the group consisting of shaking the ionomer-coated, catalyst-supporting carbon nanotubes and rotating the ionomer-coated, catalyst-supporting carbon nanotubes.

In the present invention, the method of using a wind force is preferably a method in which the ionomer that is relatively largely found in and attached to the tip end of the carbon nanotubes rather than other parts thereof, is blown off by applying a wind to at least the tip end side of the ionomer-coated, catalyst-supporting carbon nanotubes.

In the present invention, the method of using a surface tension is preferably a method in which the ionomer that is relatively largely found in and attached to the tip end of the carbon nanotubes rather than other parts thereof, is infiltrated into a highly hydrophilic material by bringing the material into contact with the tip end side of the ionomer-coated, catalyst-supporting carbon nanotubes, and then is removed.

In the present invention, the method preferably comprises a step of weakening an adhesion of the ionomer to the carbon nanotubes than the adhesion that the ionomer had at the time of the ionomer coating step, after the ionomer coating step and before the ionomer removal step.

In the present invention, the step of weakening the adhesion of the ionomer is preferably a step in which the ionomer-coated, catalyst-supporting carbon nanotubes are brought into contact with at least one of an organic solvent and a second ionomer solution that has lower ionomer concentration than the first ionomer solution.

Advantageous Effects of Invention

According to the present invention, catalyst-supporting CNTs that are evenly coated with an ionomer, can be obtained by preferentially removing the ionomer at the tip end of the CNTs in advance, before a drying step, the ionomer being likely to be relatively largely found in and attached to the tip end of the CNTs other than other parts of the CNTs.

BRIEF DESCRIPTION OF DRAWINGS

FIG. 1 (a) is a schematic sectional view showing the ionomer-coated, catalyst-supporting CNTs, being subjected to heating.

FIG. 1 (b) is a schematic sectional view showing the ionomer-coated, catalyst-supporting CNTs, after subjected to heating.

DESCRIPTION OF EMBODIMENTS

The method for producing ionomer-coated, catalyst-supporting carbon nanotubes according to the present invention, comprises: a step of preparing catalyst-supporting carbon nanotubes on at least one surface of a substrate, the nanotubes being aligned approximately perpendicular to the plane direction of the substrate; a step of preparing a first ionomer solution; an ionomer coating step of bringing the catalyst-supporting carbon nanotubes into contact with the first ionomer solution and coating the catalyst-supporting carbon nanotubes with the ionomer; and a drying step of drying the ionomer-coated, catalyst-supporting carbon nanotubes, a process containing a set of steps from the ionomer coating step to the drying step is, performed at least one time, wherein the method comprises an ionomer removal step in which, when the ionomer that is unevenly attached in a thickness direction of a layer comprising the ionomer-coated, catalyst-supporting carbon nanotubes, the ionomer that is relatively largely found in and attached to the tip end of the carbon nanotubes rather than other parts thereof, is removed after the ionomer coating step and before the drying step.

Many researches have been made on the method for coating CNTs with a coating of ionomer, etc. For example, there is a known method in which an ionomer solution is dropped onto a substrate having CNTs grown thereon, and then the dropped ionomer solution is dispersed into a CNT layer by the spin coating method. However, by the conventional method, the ionomer solution reaches the base end of CNTs along with the evaporation of a solvent. Therefore, it is thought that the ionomer is likely to be unevenly attached to the tip end of CNTs, and it is difficult to coat CNTs evenly from the base end to the tip end thereof.

It is also known that there is a method of forming a polystyrene thin layer by the plasma coating method on a CNT layer at the tip end of CNTs. However, as to this conventional method, there are no known examples of the use of a thin layer, instead of the polystyrene thin layer, formed from an ionomer for electrode catalyst layers for fuel cells. Also, in this conventional method, the polymer is precipitated from the tip end of CNTs. Therefore, especially in the case of CNTs having a long tube diameter and high density, it is thought to be difficult to coat the CNTs with a polystyrene thin layer, evenly from the base end to the tip end thereof.

Also, there is a known method of coating CNTs with polyacetylene, in which polyacetylene is dispersed in a supercritical fluid and then infiltrated into CNTs dispersed in the fluid. However, as to this conventional method, there are no known examples of the used of an ionomer for electrode catalysts for fuel cells, instead of the polyacetylene. Also, there are no known examples of applying this conventional method to CNTs fixed on a substrate. Even if the conventional method is applied to the case of coating CNTs fixed on a substrate with an ionomer, it is quite difficult to selectively precipitate the ionomer dispersed in the supercritical fluid on the CNTs on the substrate.

Figure 11:
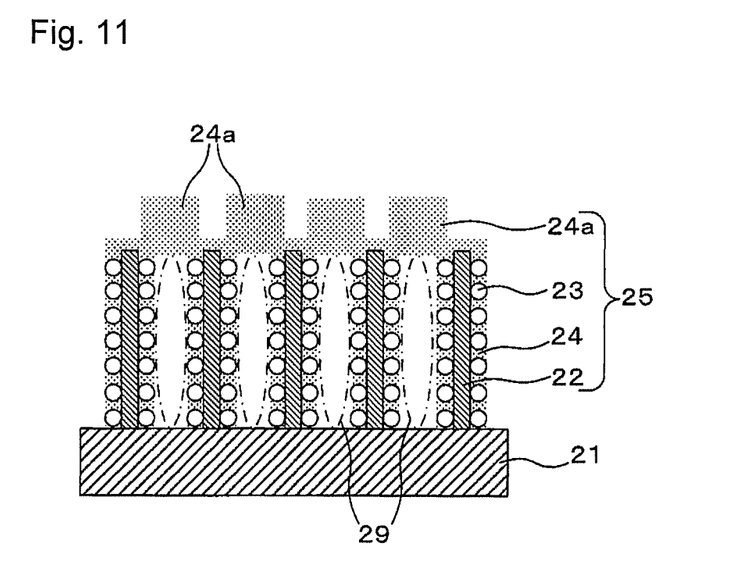
FIG. 11 is a schematic sectional view of ionomer-coated, catalyst-supporting CNTs produced by a conventional method.

FIG. 11 is a schematic sectional view of ionomer-coated, catalyst-supporting CNTs produced by a conventional method. On a substrate 21, CNTs 22 are aligned in the approximately vertical direction. Catalyst 23 (catalyst particles) is supported by each of the CNTs 22, and the CNTs 22 are coated with an ionomer 24. In ionomer-coated, catalyst-supporting CNTs 25 produced by a conventional method, an ionomer 24a is mainly attached to the tip end of the CNTs 22, unevenly. The inventor of the present invention have found that in the conventional method of coating CNTs with an ionomer or the like, the ionomer is likely to be unevenly attached to the tip end of the CNTs, which is situated on the opposite side of the substrate. The inventor of the present invention has found that in the case of using such conventional ionomer-coated, catalyst-supporting CNTs in fuel cell electrodes, due to a deterioration in gas diffusivity at the tip end of the CNTs, there is an increase in concentration overvoltage, and fuel cell performance is seriously impaired.

Also, the inventor of the present invention has found the following problem: in conventional methods of coating catalyst-supporting CNTs with an ionomer, it is quite difficult to control the state of ionomer coating, and it is quite difficult to control the thickness of an ionomer layer on the order of micrometers, the layer coating each CNT.

As a result of diligent researches, the inventor has found that CNTs can be evenly coated with an ionomer from the base end to the tip end thereof, by preferentially removing the ionomer at the tip end of the CNTs in advance, before undergoing a drying step, the ionomer being likely to be relatively largely found in and attached to the tip end of the CNTs other than other parts thereof; therefore, a fuel cell using the CNTs in the electrode can decrease the concentration overvoltage and improve the fuel cell performance. Based on these findings, the inventor completed the present invention.

The production method of the present invention comprises the following steps: (1) the step of preparing catalyst-supporting CNTs; (2) the step of preparing the first ionomer solution; (3) the ionomer coating step; (4) the ionomer removal step; and (5) the drying step. The present invention is not limited to these five steps, and the invention can further comprise a step of, for example, weakening the adhesion of the ionomer to the CNTs, as described below.

Hereinafter, the steps (1) to (5) will be explained in order.
1. The Step of Preparing Catalyst-Supporting CNTs This is a step of preparing catalyst-supporting CNTs on at least one surface of a substrate, the CNTs being aligned approximately perpendicular to the plane direction of the substrate.

In the production method of the present invention, it is allowed to use catalyst-supporting CNTs produced in advance, or to use a commercially-available product of catalyst-supporting CNTs.

The method for producing catalyst-supporting CNTs is not particularly limited. To obtain desired catalyst-supporting CNTs, for example, the following steps (a) and (b) can be performed, both of which will be explained below: (a) the step of growing CNTs on a substrate and (b) the step of allowing the CNTs to support a catalyst. Also, (c) the step of providing water-repellency to the CNTs (water repellency treatment step) can be further performed.

From the viewpoint of estimating the mass of the ionomer that is used to coat the CNTs, it is preferable to preliminarily measure the mass of the CNTs used in the present invention and/or the mass of the catalyst-supporting CNTs used in the present invention.

(a) The Step of Growing CNTs on a Substrate

First, a substrate is used in this step, the substrate supporting fine metal particles. As the substrate, a silicon substrate, a glass substrate, a quarts substrate or the like can be used. The substrate is not particularly limited as long as it can form a layer of CNTs evenly, and the substrate can be in a plate form or a sheet form. As needed, the surface of the substrate is washed. To wash the substrate, for example, there may be mentioned a heating treatment in a vacuum.

The fine metal particles serve as the core for growing the CNTs. For example, there may be used iron, nickel, cobalt, manganese, molybdenum, palladium, etc. A thin metal film is formed on the substrate by electron beam evaporation, etc., or by applying a solution containing any of the metals or a complex of thereof. By heating the film to 700 to 750° C. under an inert atmosphere or reduced pressure, the thin metal film is changed into fine particles and fine metal particles can be supported on the substrate, therefore. It is preferable that the fine metal particles generally have a particle diameter of about 5 to 20 nm. To support fine metal particles having such a particle diameter, the thin metal film preferably has a thickness of about 3 to 10 nm.

Next, CNTs are grown on the substrate. For growing CNTs, the substrate is placed in a space under an inert atmosphere and at a predetermined temperature that is suitable for growing CNTs (generally about 700 to 750° C.) and then a source gas is supplied to the fine metal particles on the substrate. As the source gas, for example, a hydrocarbon gas such as acetylene, methane or ethylene can be used.

The flow rate, supply time, and total supply amount of the source gas are not particularly limited. They can be appropriately determined based on the tube length or diameter of the CNTs. For example, depending on the concentration of the supplied source gas [source gas flow rate/(source gas flow rate+inert gas flow rate)], the growth and thus the length of the CNTs vary. That is, the higher the concentration of the supplied source gas, the shorter the length of the CNTs.

Also, when the CNTs grow, soot is produced. The soot is deposited around the fine metal particles and may block the source gas supply to the fine metal particles. The growth of the CNTs proceeds using the fine metal particles on the substrate as the core. Therefore, when the source gas supply to the fine metal particles is blocked, it is thought that the growth of the CNTs in the tube length direction is stopped, and the CNTs are mainly grown in the tube diameter direction.

It is preferable that the length of the CNTs is 10 to 200 μm; the tube diameter is 1 to 50 nm; and the space between the CNTs is 50 to 300 nm. This is because the CNTs can be support a sufficient amount of catalyst when allowing the CNTs to support the catalyst.

The CNTs can be obtained as described above, which are aligned substantially perpendicular to the plane direction of the substrate, on the substrate. The CNTs which are aligned substantially perpendicularly to the plane direction of the substrate, encompass CNTs in which the shape in the tube length direction is a straight line shape and/or is not a straight line shape. In the case of the CNTs in which the shape in the tube length direction is a straight line shape, the CNTs are those in which the angle between the straight line and the plane direction of the substrate is almost a right angle. In the case of the CNTs in which the shape in the tube length direction is not a straight line shape, the angle between the plane direction of the substrate and the straight line joining the center of the tip end surface to that of the base end surface, is almost a right angle.

The above-described growth of the CNTs uses the chemical vapor deposition (CVD) method in which the fine metal particles (catalyst metal) and the source gas are allowed to coexist under a high temperature condition to grow the CNTs. However, the method for growing the CNTs is not limited to the CVD method. For example, the CNTs can be produced by a vapor deposition method such as an arc discharge method or laser deposition method, or by a known synthesis method.

(b) The Step of Allowing the CNTs to Support a Catalyst

The method for allowing the CNTs to support a catalyst, is not particularly limited, and any of a wet method and a dry method can be used. As the wet method, there may be mentioned a method in which a solution containing a metal salt is applied onto the surface of the CNTs, and a reduction treatment is performed by heating the CNTs in a hydrogen atmosphere to 200° C. or more. Examples of the metal salt include the following: halides of the metals mentioned above as the catalyst; metal acid halides; inorganic acid salts of metals; organic acid salts of metals; and metal complex salts. The solution containing the metal salt can be an aqueous solution or an organic solvent solution. To apply the metal salt solution onto the CNT surface, there may be mentioned a method of immersing the CNTs in the metal salt solution and a method of dropping or spraying the metal salt solution onto the CNT surface, for example.

For example, in the case of using platinum as the catalyst, a platinum salt solution can be used in the wet method, which is obtained by dissolving an appropriate amount of chloroplatinic acid, platinum nitric acid solution (e.g., dinitrodiammine platinum nitric acid solution) or the like in alcohol such as ethanol or isopropanol. From the point of view that platinum can be evenly supported on the CNT surface, it is particularly preferable to use a platinum salt solution obtained by a dissolving dinitrodiammine platinum nitric acid solution in alcohol.

Examples of the dry method include an electron beam evaporation method, a sputtering method and an electrostatic coating method.

(c) The Water Repellency Treatment Step

As the water repellent agent used to perform a water repellency treatment on the CNTs, a known agent can be used. It is particularly preferable to select at least one kind of fluorine resin for use, and there may be used polytetrafluoroethylene (PTFE), polyvinylidene fluoride (PVDF) and CYTOP (product name; manufactured by Asahi Glass Co., Ltd.), for example.

It is also allowed that the water repellency treatment is performed before the catalyst is supported as described above, and then the supporting of the catalyst is performed. In this case, however, the supporting of the catalyst is limited to the electrostatic coating method or the wet method using a platinum salt solution, in which high temperature is not needed for supporting. This is because a water repellent layer may be deteriorated when the supporting of the catalyst is performed at high temperature, after the water repellency treatment.

2. The Step of Preparing the First Ionomer Solution

The first ionomer solution used in the present invention is not particularly limited, as long as it becomes a raw material for the ionomer that is used to coat the catalyst-supporting CNTs. The first ionomer solution can contain the ionomer in the form of solids, or the first ionomer solution can be a solution in which the ionomer is absolutely dissolved.

The first ionomer solution used in the present invention can be one prepared in advance or can be a commercially-available ionomer solution. Hereinafter, an example of preparing the first ionomer solution will be explained.

First, an undiluted ionomer solution is prepared. Examples of undiluted ionomer solutions include perfluorocarbon sulfonic acid polymer solutions such as a Nafion (trade name) solution.

Next, the undiluted ionomer solution is filtered by a filter made of Teflon (trade name) to remove aggregated coarse ionomer particles therefrom. Then, a dilution solvent such as acetone or ethanol is appropriately added to the thus-obtained filtrate to obtain a desired solid content. The dilution solvent is preferably an organic solvent having a low boiling point at normal pressure, such as ethanol or acetone. By using such a low-boiling-point solvent, uneven ionomer precipitation can be prevented in the below-described CNT drying step, which is derived a difference in solvent volatilization in the thickness direction of a layer comprising the ionomer-coated, catalyst-supporting CNTs.

The ionomer solution preferably has a solid content of 10% or less, and more preferably 5% or less. When the ionomer solution has a solid content of more than 10%, the solid content is too high and the flowability of the ionomer solution is lost. Therefore, there is a difficulty in coating the CNTs with the ionomer solution and the ionomer cannot reach the base end of the CNTs, so that there may be an uneven distribution of the ionomer from the base end to the tip end of the CNTs. The base end of the CNTs means a part from which each CNT started to grow, and when the CNTs are grown on the substrate, the base end means a part which is in contact with the substrate. The tip end of the CNTs means an end part of each CNT, which is on the opposite side of the base end. When the CNTs are grown on the substrate, the tip end means an end part of each CNT, which is on the opposite side of the substrate.

On the other hand, when the solid content of the ionomer solution is too low, it is difficult to apply a desired amount of ionomer to the CNTs. Accordingly, the ionomer solution preferably has a solid content of 2% or more.

The ionomer solution is appropriately diluted to have a desired solid content. Then, the ionomer is highly dispersed in the solution by ultrasonic treatment. The solution is then subjected to centrifugal stirring or the like, thereby obtaining a supernatant, which is the first ionomer solution.

3. The Ionomer Coating Step

This is a step of bringing the catalyst-supporting CNTs into contact with the above-described first ionomer solution and coating the catalyst-supporting CNTs with the ionomer.

The embodiment of bringing the catalyst-supporting CNTs into contact with the first ionomer solution is not particularly limited, as long as the whole catalyst-supporting CNTs is wetted with the first ionomer solution. Examples of the embodiments of bringing the catalyst-supporting CNTs into contact with the first ionomer solution, include the following: an embodiment in which the catalyst-supporting CNTs are immersed in the first ionomer solution; an embodiment in which the first ionomer solution is dropped to the catalyst-supporting CNTs; and an embodiment in which the first ionomer solution is applied to the catalyst-supporting CNTs.

It is preferable that the catalyst-supporting CNTs brought into contact with the first ionomer solution, are exposed to a vacuum in a vacuum container to appropriately remove bubbles therefrom. By removing gas confined between the catalyst-supporting CNTs and the ionomer, such as air, the ionomer can reach the base end to the tip end of the catalyst-supporting CNTs and the coverage of the catalyst-supporting CNTs with the ionomer can be increased.

4. The Ionomer Removal Step

This is a step in which, when the ionomer that is unevenly attached in a thickness direction of a layer comprising the ionomer-coated, catalyst-supporting CNTs, the ionomer that is relatively largely found in and attached to the tip end of the CNTs rather than other parts thereof, is removed after the ionomer coating step and before the drying step to be described below.

The ionomer that is unevenly attached in a thickness direction of a layer comprising the ionomer-coated, catalyst-supporting CNTs (hereinafter may be referred to as "ionomer-coated, catalyst-supporting CNTs") means that the distribution of the amount of the ionomer attached to the base and to the tip end of the CNTs, is uneven. Examples of methods for determining uneven ionomer distribution include a method in which the surface of the layer comprising the ionomer-coated, catalyst-supporting CNTs is visually observed and when the ionomer is found to be excessively attached to the surface, it is determined that the ionomer is unevenly distributed.

In this step, removing preferentially the ionomer at the tip end of the CNTs does not mean that only the ionomer at the tip end of the CNTs is removed. In this step, removing preferentially the ionomer at the tip end of the CNTs means that the amount of the excess ionomer removed from the tip end of the CNTs is larger than the amount of the excess ionomer removed from other parts of the CNTs.

In the case of performing the ionomer coating step only one time, by removing in this step the ionomer attached excessively to the tip end of the CNTs, as indicated in Examples shown below, it is possible to decrease the excess ionomer used to coat the catalyst-supporting CNTs and to increase production efficiency. In the case of performing the ionomer coating step two or more times, by removing in the steps the ionomer attached excessively to the tip end of the CNTs, as indicated in Examples shown below, the ionomer coating amount can be increased as the number of the performed ionomer coating steps increases, so that the ionomer coating can be performed more efficiently than ever before.

Concrete examples of methods for removing the excess ionomer at the tip end of CNTs, include a method of using heat, a method of using a gravitational force, a method of using an inertial force, a method of using a wind force, and a method of using a surface tension. By these physical methods, the excess ionomer can be detached mainly from the tip end of the CNTs. The methods for removing the excess ionomer at the tip end of the CNTs are not limited to these five methods only.

The method of using heat is preferably a method for burning off the ionomer that is relatively largely found in and attached to the tip end of the CNTs rather than other parts thereof, by heating the tip end side of the ionomer-coated, catalyst-supporting CNTs with a heating means such as laser or heat ray or with heating means such as laser and heat ray.

Figure 1A:
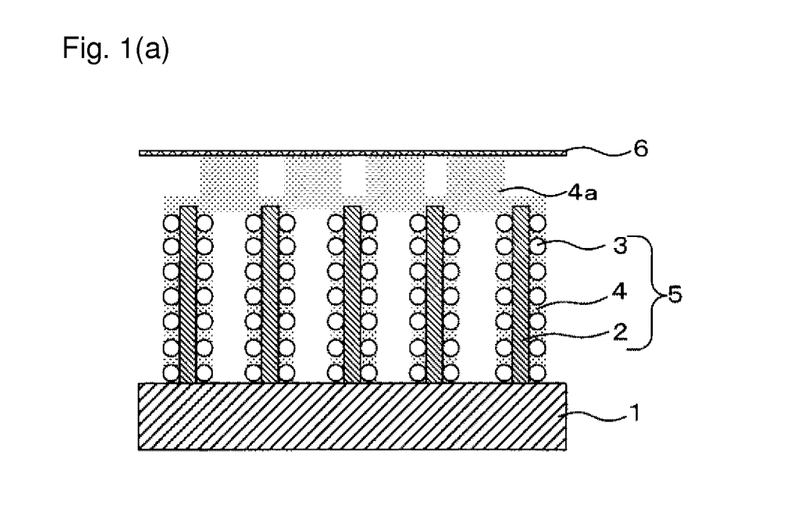
Figure 1B:
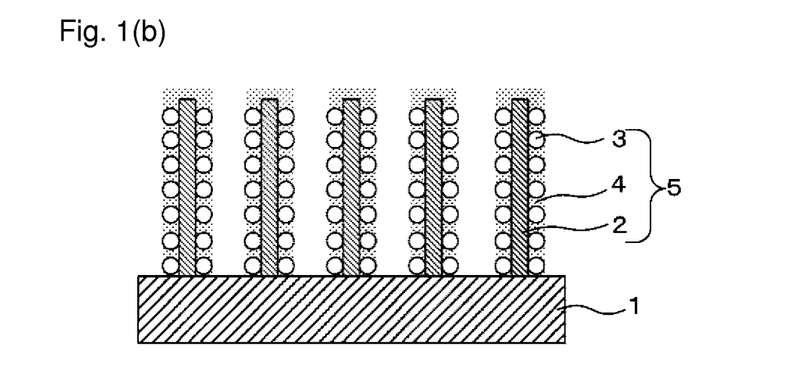

FIG. 1($a$) is a schematic sectional view showing the ionomer-coated, catalyst-supporting CNTs, being subjected to heating. FIG. 1($b$) is a schematic sectional view showing the ionomer-coated, catalyst-supporting CNTs, after subjected to heating.

As shown in FIG. 1($a$), as the heating means, a heat source 6 is used to apply heat to the tip end side of ionomer-coated, catalyst-supporting CNTs 5. Concrete examples of the heat source 6 include laser, plasma and heat ray. From the viewpoint of evaporating excess ionomer 4$a$ only, without any damage to the CNTs, it is preferable that the heat source 6 applies heat only to the ionomer 4$a$ at the tip end of the CNTs.

After applying heat from the heat source 6, as shown in FIG. 1($b$), the ionomer-coated, catalyst-supporting CNTs 5 are obtained, in which the excess ionomer 4$a$ at the tip end of the CNTs has disappeared.

The temperature of the heat applied from the heat source for evaporation and removal of the ionomer, is preferably 40 to 180° C., depending on the type of the heat source. From the viewpoint of removing the excess ionomer only, without any damage to the CNTs, the time to apply heat from the heat source to the tip end side of the CNTs is preferably 10 seconds to 120 minutes.

The method of using a gravitational force is preferably a method in which the ionomer that is relatively largely found in and attached to the tip end of the CNTs rather than other parts thereof, is removed by inclining the plane direction of the substrate at an angle $\theta$ (0°≤$\theta$<90°) with respect to the vertical direction.

Figures 2A, 2B:
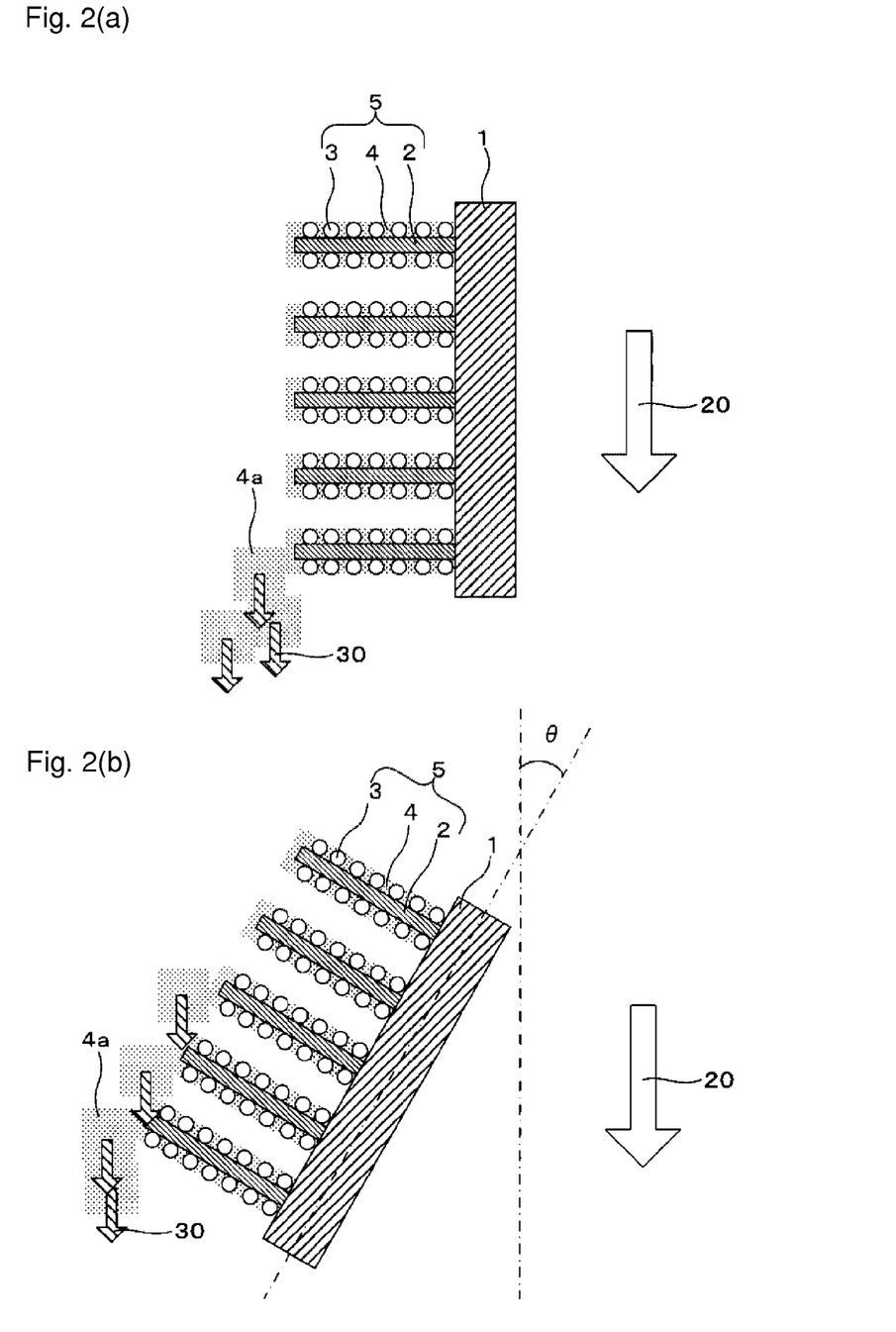
FIG. 2(a) is a schematic sectional view showing the ionomer-coated, catalyst-supporting CNTs, in which the plane direction of a substrate is inclined in the vertical direction (θ=0°).
FIG. 2(b) is a schematic sectional view showing the ionomer-coated, catalyst-supporting CNTs, in which the plane direction of the substrate is inclined at an angle θ (0°<θ<90°) with respect to the vertical direction.

FIGS. 2($a$) and 2($b$) are each a schematic sectional view showing the ionomer-coated, catalyst-supporting CNTs, in which the plane direction of a substrate is inclined. An arrow 20 indicates the vertical direction.

FIG. 2($a$) is a schematic sectional view showing the ionomer-coated, catalyst-supporting CNTs, in which the plane direction of a substrate is inclined in the vertical direction ($\theta$=0°). Arrows 30 indicate the direction of the own weight of the ionomer 4$a$. As shown in FIG. 2($a$), by inclining the plane direction of the substrate, the excess ionomer 4$a$ can be removed by its own weight to the lower side of the vertical direction. FIG. 2($b$) is a schematic sectional view showing the ionomer-coated, catalyst-supporting CNTs, in which the plane direction of the substrate is inclined at an angle $\theta$ (0°<$\theta$<90°) with respect to the vertical direction. As shown in FIG. 2($b$), the same effect as that of the case of FIG. 2($a$) can be obtained even by inclining the plane direction of the substrate at an angle $\theta$ (0°<$\theta$<90°) with respect to the vertical direction.

The method of using an inertial force is preferably a method in which the ionomer that is relatively largely found in and attached to the tip end of the CNTs rather than other parts thereof, is shaken off by shaking the ionomer-coated, catalyst-supporting CNTs and/or rotating the ionomer-coated, catalyst-supporting CNTs.

The method for applying an inertial force to the ionomer-coated, catalyst-supporting CNTs is not particularly limited, as long as it is a method that can remove the excess ionomer only, without any damage to the catalyst-supporting structure of the CNTs. As the method for applying an inertial force, for example, there may be mentioned a method of shaking off the ionomer solution remaining excessively on the surface of the CNT layer, by shaking the ionomer-coated, catalyst-supporting CNTs manually or automatically. The shaking direction is not particularly limited. However, from the viewpoint of shaking off the ionomer excessively attached to the tip end of the CNTs, it is preferable to shake the CNTs in a direction that is approximately parallel to the plane direction of the substrate.

Figure 3A:
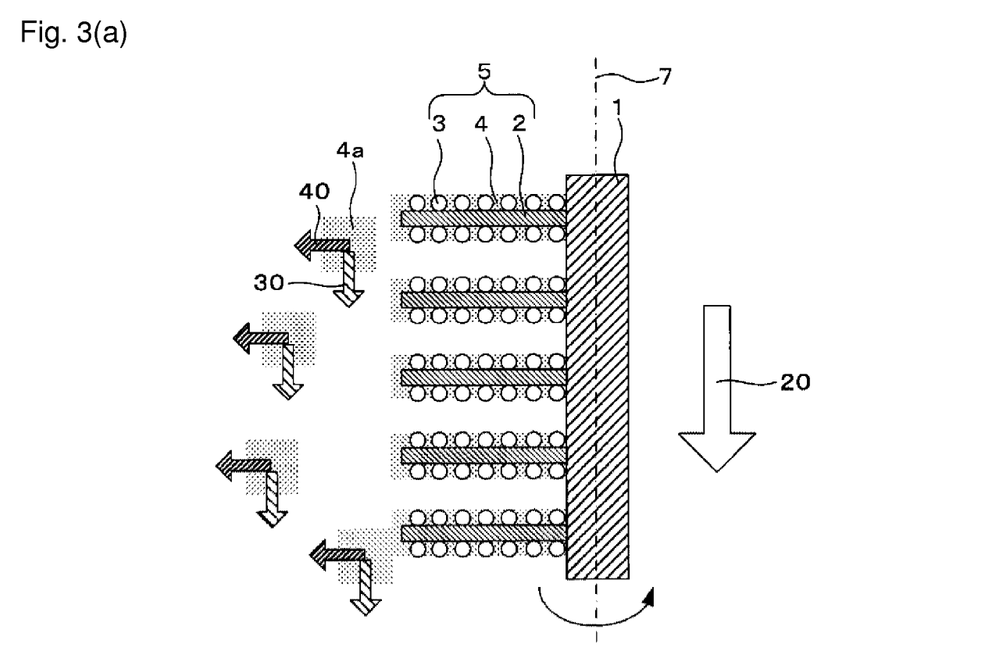
FIG. 3(a) is a schematic sectional view showing the ionomer-coated, catalyst-supporting CNTs, which are rotated and in which the plane direction of a substrate is inclined in the vertical direction (θ=0°).
Figure 3B:
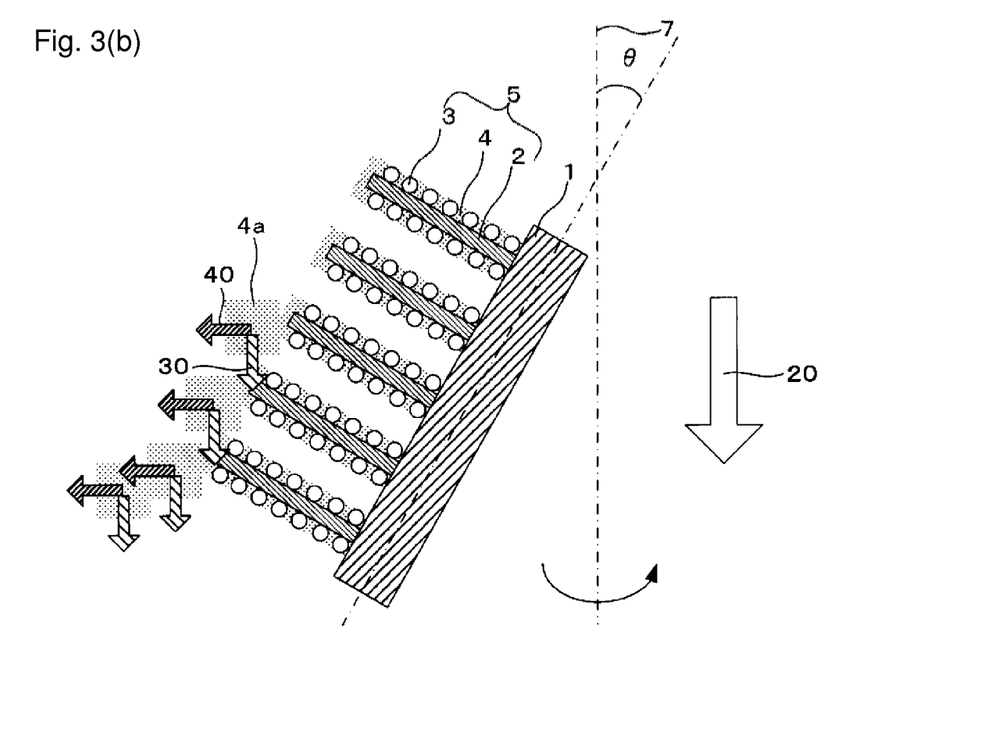
FIG. 3(b) is a schematic sectional view showing the ionomer-coated, catalyst-supporting CNTs, which are rotated and in which the plane direction of the substrate is inclined at an angle θ (0°<θ<90°) with respect to the vertical direction.

FIGS. 3(a) and 3(b) are each a schematic sectional view showing the ionomer-coated, catalyst-supporting CNTs, which are rotated and in which the plane direction of a substrate is inclined and rotated. An arrow 20 indicates the vertical direction. An alternate long and short dash line 7 indicates a rotation axis.

FIG. 3(a) is a schematic sectional view showing the ionomer-coated, catalyst-supporting CNTs, which are rotated and in which the plane direction of a substrate is inclined in the vertical direction ($\theta=0°$). Arrows 30 indicate the direction of the own weight of the ionomer 4a. Arrows 40 indicate the direction of an inertial force (centrifugal force) applied to the ionomer 4a. As shown in this figure, the excess ionomer 4a can be removed by its own weight and the centrifugal force, to the lower oblique side of the vertical direction. FIG. 3(b) is a schematic sectional view showing the ionomer-coated, catalyst-supporting CNTs, which are rotated and in which the plane direction of the substrate is inclined at an angle $\theta$ ($0°<\theta<90°$) with respect to the vertical direction. As shown in FIG. 3(b), the same effect as that of the case of FIG. 3(a) can be obtained, even if the CNTs are rotated and the plane direction of the substrate is inclined at an angle $\theta$ ($0°<\theta<90°$) with respect to the vertical direction.

The rotation of the ionomer-coated, catalyst-supporting CNTs as shown in FIGS. 3(a) and 3(b) is realized by, for example, setting up the substrate in a centrifuge.

The method of using a wind force is preferably a method in which the ionomer that is relatively largely found in and attached to the tip end of the CNTs rather than other parts thereof, is blown off by applying a wind to at least the tip end side of the ionomer-coated, catalyst-supporting CNTs.

Figure 4A:
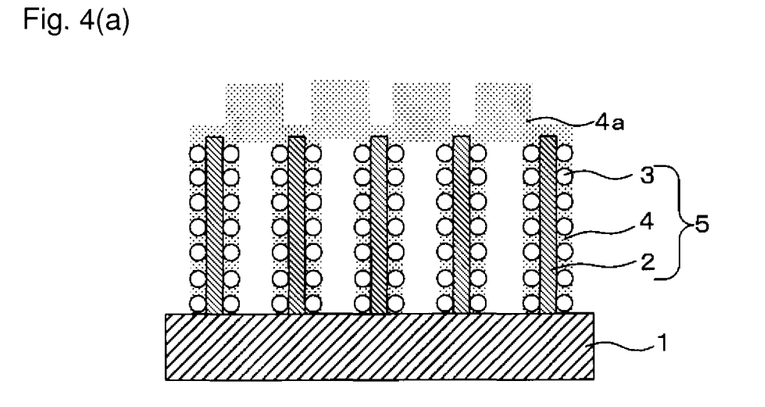
FIG. 4(a) is a schematic sectional view showing the ionomer-coated, catalyst-supporting CNTs, before blowing off the ionomer by a wind.
Figure 4B:
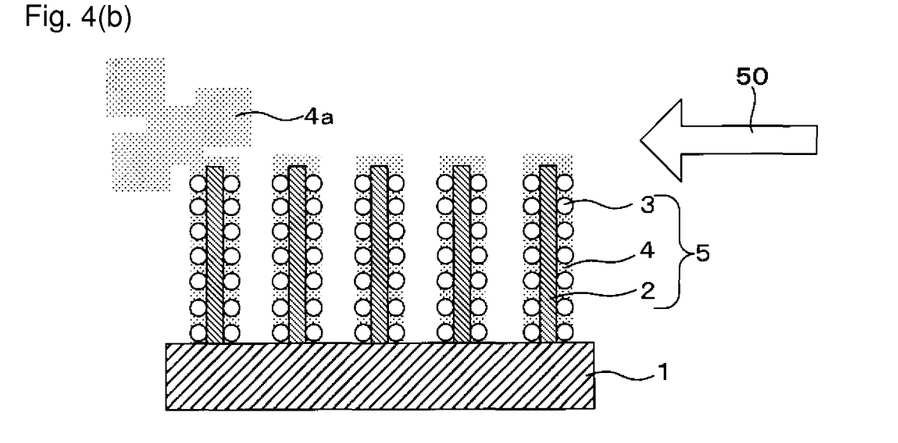
FIG. 4(b) is a schematic sectional view showing the ionomer-coated, catalyst-supporting CNTs, during blowing off the ionomer by a wind.

FIG. 4(a) is a schematic sectional view showing the ionomer-coated, catalyst-supporting CNTs, before blowing off the ionomer by a wind. FIG. 4(b) is a schematic sectional view showing the ionomer-coated, catalyst-supporting CNTs, during blowing off the ionomer by a wind. An arrow 50 shown in FIG. 4(b) indicates the direction of the wind.

In this method, as shown in FIG. 4(b), the excess ionomer 4a is blown off by a strong wind. Examples of means for blowing off a strong wind to the ionomer at the tip end of the CNTs, include a dryer and a fan. When applying a hot wind from a dryer or the like, the wind temperature is preferably about 25 to 35° C. so as not to dry the ionomer. From the viewpoint of blowing off the excess ionomer 4a only, without any damage to the catalyst-supporting structure of the CNTs, it is preferable to apply a wind locally, only to the ionomer 4a at the tip end of the CNTs.

The method of using a surface tension is preferably a method in which the ionomer that is relatively largely found in and attached to the tip end of the CNTs rather than other parts thereof, is infiltrated into a highly hydrophilic material by bringing the material into contact with the tip end side of the ionomer-coated, catalyst-supporting CNTs, and then is removed.

Figures 5A, 5B:
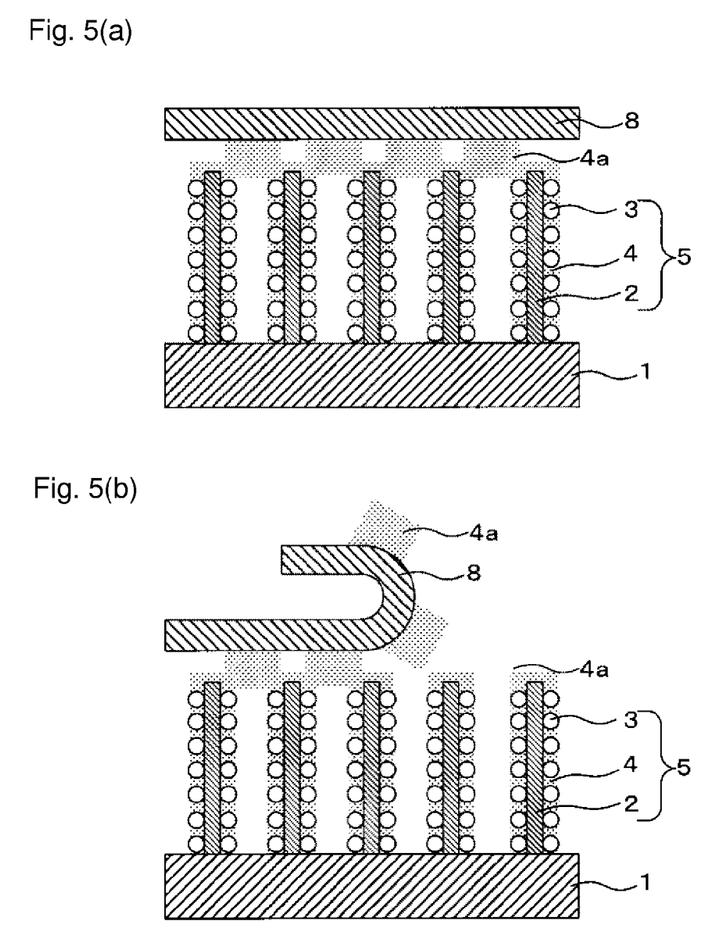
FIG. 5(a) is a schematic sectional view showing the ionomer-coated, catalyst-supporting CNTs, in which a highly hydrophilic material is attached to the tip end side of the CNTs.
FIG. 5(b) is a schematic sectional view showing the ionomer-coated, catalyst-supporting CNTs, in the process of peeling off the highly hydrophilic material.

FIG. 5(a) is a schematic sectional view showing the ionomer-coated, catalyst-supporting CNTs, in which a highly hydrophilic material is attached to the tip end side of the CNTs. FIG. 5(b) is a schematic sectional view showing the ionomer-coated, catalyst-supporting CNTs, in the process of peeling off the highly hydrophilic material. In FIG. 5(b), to emphasize the removal of the ionomer 4a, the removed ionomer 4a is shown to be attached to the highly hydrophilic material 8. However, the removed ionomer 4a can be also infiltrated into the highly hydrophilic material 8.

As shown in FIGS. 5(a) and 5(b), the excess ionomer 4a can be wiped off by bringing the highly hydrophilic material 8, that is, a material with a small surface tension into contact with the tip end side of the CNTs and then peeling off the material.

As the material with a small surface tension, that is, as the highly hydrophilic material, there may be mentioned gauze, absorbent cotton, waste cloth, tissues, etc.

The above-described methods (the method of using heat, the method of using a gravitational force, the method of using an inertial force, the method of using a wind force, and the method of using a surface tension) can be conducted alone or in combination of two or more kinds.

The method for producing ionomer-coated, catalyst-supporting CNTs according to the present invention preferably comprises a step of weakening an adhesion of the ionomer to the CNTs than the adhesion that the ionomer had at the time of the ionomer coating step, after the ionomer coating step and before the ionomer removal step.

Weakening the adhesion is to make the ionomer less likely to attach to the CNTs. Examples of ways to weaken the ionomer's adhesion include exposing the ionomer-coated, catalyst-supporting CNTs to a liquid phase and exposing the ionomer-coated, catalyst-supporting CNTs to a liquid phase and then stirring the liquid phase.

The step of weakening the adhesion of the ionomer is preferably a step in which the ionomer-coated, catalyst-supporting CNTs are brought into contact with an organic solvent and/or a second ionomer solution that has lower ionomer concentration than the first ionomer solution.

The embodiment of bringing the ionomer-coated, catalyst-supporting CNTs into contact with the second ionomer solution and/or an organic solvent, is not particularly limited, as with the embodiment of bringing the ionomer-coated, catalyst-supporting CNTs into contact with the first ionomer solution.

The second ionomer solution is not particularly limited, as long as it is lower in ionomer concentration and/or solid content than the first ionomer solution. The second ionomer solution can be a solution having a solid content of 0%. The second ionomer solution can be prepared in the same manner as the first ionomer solution.

As the organic solvent, there may be used acetone, ethanol, etc., which are those used for the first ionomer solution.

By bringing the ionomer-coated, catalyst-supporting CNTs into contact with the second ionomer solution, the excess ionomer at the tip end of the CNTs can be dissolved into the second ionomer solution, or the adhesion of the excess ionomer to the CNTs can be weakened. As a result, the subsequent ionomer removal can be promoted quickly.

5. The Drying Step

This is a step of drying the ionomer-coated, catalyst-supporting CNTs.

The drying method is not particularly limited, as long as it is a method which causes no damage to the catalyst-supporting structure of the CNTs and which can remove only the solvent used for ionomer coating.

Examples of drying methods include heat drying, drying under reduced pressure and heat drying under reduced pressure. Drying under reduced pressure and/or high temperature is preferable, since it can prevent uneven ionomer precipitation that is derived from a difference in solvent volatilization in the thickness direction of a layer comprising the ionomer-coated, catalyst-supporting CNTs.

Detailed drying conditions vary depending on the type of the ionomer. However, drying is preferably performed under a pressure of 10 to 1,000 Pa and/or a temperature of 60 to 180°

C. The drying temperature is preferably equal to or less than the glass transition temperature of the ionomer.

The process containing a set of steps from the ionomer coating step to the drying step can be performed at least one time or more times.

For example, by the following method, it can be determined whether the process should be performed one time or more times. First, from the mass (A) of catalyst-supporting CNTs, which are a raw material, the preferable mass (B) of the ionomer to be coated is calculated in advance. Upon the completion of the drying step, the mass (C) of the ionomer-coated, catalyst-supporting CNTs is calculated. When the mass (C) is equal to or more than the sum of the mass (A) and the mass (B), the ionomer coating amount can be determined to be equal to or more than the desired amount, and it is not necessary to repeat the process more than one time. However, when the mass (C) is less than the sum of the mass (A) and the mass (B), the ionomer is determined to be less than the desired amount and the process is repeated again (a set of steps including the ionomer coating step to the drying step is repeated again). As just described, by repeating the process two or more times until the desired ionomer coating amount is obtained, the catalyst-supporting CNTs coated evenly with the desired amount of ionomer can be produced.

By the production method of the present invention, the excess ionomer attached mainly to the tip end of the CNTs can be reduced, and the ionomer distribution from the base end to the tip end of CNTs can be even.

Figure 6:
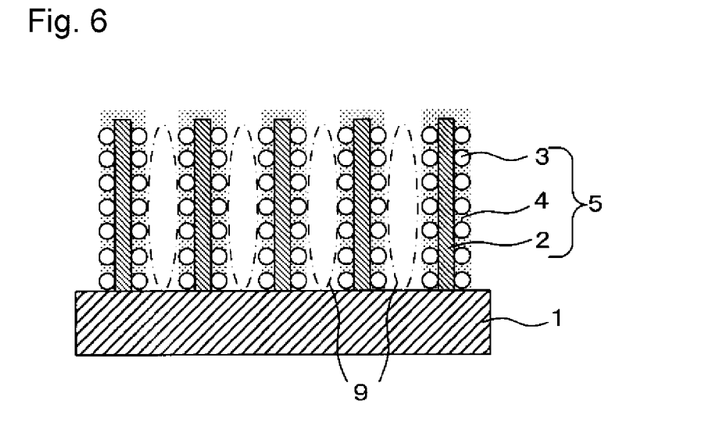
FIG. 6 is a schematic sectional view of ionomer-coated, catalyst-supporting CNTs produced by the production method of the present invention.

FIG. 6 is a schematic sectional view of ionomer-coated, catalyst-supporting CNTs produced by the production method of the present invention. On a substrate 1, CNTs 2 are aligned in an approximately perpendicular direction. The CNTs 2 support a catalyst 3 (catalyst particles) and are coated with an ionomer 4. In ionomer-coated, catalyst-supporting CNTs 5 produced by the production method of the present invention, the distribution of the ionomer 4 is even from the base end to the tip end of the CNTs.

By the production method of the present invention, the excess ionomer unevenly distributed to the tip end of the CNTs can be removed before drying, and also it is possible to save the ionomer amount and to increase the production efficiency.

In the case of performing two or more times the process containing a set of steps from the ionomer coating step to the drying step, the ionomer has been inhibited from reaching the base end of the CNTs, by the excess ionomer distributed unevenly to the tip end of the CNTs. However, by the production method of the present invention, the ionomer can reach the base end of the CNTs, and an even coating with the ionomer is possible.

As shown in FIG. 11, spaces between ionomer-coated, catalyst-supporting CNTs produced by a conventional production method, which are spaces 29 enclosed by an alternate long and short dash line, are blocked by an ionomer 24a. Therefore, even if the process of bringing the CNTs into contact with the ionomer solution and then drying them is repeated, there has been no increase in ionomer coating amount, as long as the ionomer cannot reach the base end of the CNTs. Also in the case of using the ionomer-coated, catalyst-supporting CNTs 25 shown in FIG. 11 in fuel cell electrodes, since the spaces between the CNTs are blocked by the ionomer, poor gas diffusivity is obtained. Moreover, due to the uneven ionomer coating, the rate of utilization of a catalyst 24 (catalyst particles) supported by the CNTs 25 has been low.

In the production method of the present invention, however, as shown in FIG. 6, the spaces between the CNTs, which are spaces 9 enclosed by an alternate long and short dash line, are not blocked by the ionomer; therefore, the ionomer solution can be infiltrated into all the spaces between the CNTs. As a result, the thickness of the ionomer coating on the catalyst-supporting CNTs can be readily controlled by the number of the processes performed, each process being a process containing a set of steps from the ionomer coating step to the drying step. Moreover, by preventing uneven ionomer distribution and coating, when the CNTs are used in fuel cell electrodes, there is a lower concentration overvoltage than the case of using conventional CNT electrodes; therefore, an increase in battery performance can be obtained.

In the case of using a highly-concentrated ionomer solution or an ionomer solution with a high solid content, it has been possible to reduce the number of contacts between the CNTs and the ionomer solution to be performed until the desired ionomer amount (e.g., I/C amount) is obtained. However, there is a disadvantage that it has been difficult to allow the ionomer to reach the base end of the CNTs and to cover the CNTs with the ionomer from the tip end to the base end of the CNTs. However, by the production method of the present invention, uneven ionomer precipitation at the tip end of the CNTs can be reduced; therefore, the number of contacts between the ionomer solution and the CNTs can be significantly reduced, regardless of the concentration or solid content of the ionomer solution.

EXAMPLES

Hereinafter, the present invention will be explained further in detail, by way of examples. However, the scope of the present invention is not limited to these examples.

1. Preparation of Catalyst-Supporting CNTs

Production Example 1

First, as catalyst metal, an iron catalyst was sputtered on a silicon substrate to form a film. The substrate having the catalyst metal film formed thereon was placed in a CVD furnace.

Next, a hydrogen 25% gas (carrier: nitrogen) was supplied into the CVD furnace. The temperature inside the furnace was increased from room temperature (15 to 25° C.) to 800° C. for 5 minutes to activate the catalyst metal.

Then, in addition to the hydrogen 25% gas (carrier: nitrogen), an acetylene 8% gas (carrier: nitrogen) was supplied into the CVD furnace, as a carbon source. The temperature inside the furnace was kept at 800° C., and CNTs were grown for 10 minutes.

Finally, a nitrogen 100% gas was supplied into the CVD furnace. The temperature inside the furnace was decreased from 800° C. to room temperature (15 to 25° C.) for 5 minutes to terminate the CNT growth, thus producing approximately perpendicularly aligned CNTs. By a known method, platinum was appropriately supported on the thus-obtained CNTs, thereby obtaining the catalyst-supporting CNTs of Production Example 1.

2. Production of Ionomer-Coated, Catalyst-Supporting CNTs and Measurement of Infiltrated Ionomer Amount (I/C Amount)

Example 1

The catalyst-supporting CNTs of Production Example 1 and an ionomer solution diluted to a solid content of 8%, were used. (Hereinafter, the ionomer solution will be referred to as "8% solid content ionomer solution.")

The catalyst-supporting CNTs were immersed in the 8% solid content ionomer solution. After five minutes, the ionomer-coated, catalyst-supporting CNTs were taken out and left at room temperature (15 to 25° C.) in the state that the plane direction of the substrate was inclined in the vertical direction. Then, the ionomer-coated, catalyst-supporting CNTs were immersed in 100% ethanol. After one minutes, the ionomer-coated, catalyst-supporting CNTs were taken out and left at room temperature (15 to 25° C.) in the state that the plane direction of the substrate was inclined in the vertical direction.

The above steps were regarded as one process, and the infiltrated ionomer amount (hereinafter referred to as I/C amount) was measured per process by the following method.

First, at room temperature, the mass of the CNTs (that is, the mass (C)) was measured in advance, by an electronic weighing scale. Next, in the same condition, the mass of the catalyst-supporting CNTs before infiltrated with the ionomer (that is, the mass ($I_0$)) was measured. Also, in the same condition, the mass of the catalyst-supporting CNTs after infiltrated n times with the ionomer (that is, the mass ($I_n$)) was measured (n=1 to 4). The difference between the mass ($I_n$) and the mass ($I_0$) was regarded as the mass of the ionomer after each process (that is, the mass (I)). The value obtained by dividing the mass (I) by the mass (C) was regarded as the infiltrated ionomer amount after each process (that is, I/C).

After completing a total of four processes, the CNTs were dried for 10 seconds, by means of a hot plate, in the atmosphere and under a temperature condition of 100° C., thus obtaining the ionomer-coated, catalyst-supporting CNTs of Example 1.

Example 2

The ionomer-coated, catalyst-supporting CNTs of Examples 2 were obtained in the same manner as Example 1, except that an ionomer solution diluted to a solid content of 3.5% (hereinafter referred to as 3.5% solid content ionomer solution) was used in place of the 8% solid content ionomer solution. Coating of the catalyst-supporting CNTs with the ionomer, measurement of the I/C amount after each process, and drying were performed in the same manner as Example 1.

Comparative Example 1

The catalyst-supporting CNTs were immersed in the 8% solid content ionomer solution. After five minutes, the ionomer-coated, catalyst-supporting CNTs were taken out.

The above steps were regarded as one process, and in the same manner as Example 1, the I/C amount was measured per process. After completing a total of four processes, the CNTs were dried in the same condition as Example 1, thus obtaining the ionomer-coated, catalyst-supporting CNTs of Comparative Example 1. More particularly, both of the following steps were not performed in Comparative Example 1: the step of leaving the CNTs in the state that the plane direction of the substrate was inclined in the vertical direction, and the step of immersing the ionomer-coated, catalyst-supporting CNTs in 100% ethanol.

Comparative Example 2

The catalyst-supporting CNTs were immersed in the 3.5% solid content ionomer solution. After one minute, the ionomer-coated, catalyst-supporting CNTs were taken out.

The above steps were regarded as one process, and the I/C amount was measured per process, by the same manner as Example 1. After completing a total of four processes, the CNTs were dried in the same condition as Example 1, thus obtaining the ionomer-coated, catalyst-supporting CNTs of Comparative Example 2. More particularly, both of the following steps were not performed in Comparative Example 2: the step of leaving the CNTs in the state that the plane direction of the substrate was inclined in the vertical direction, and the step of immersing the ionomer-coated, catalyst-supporting CNTs in 100% ethanol.

Figure 7:
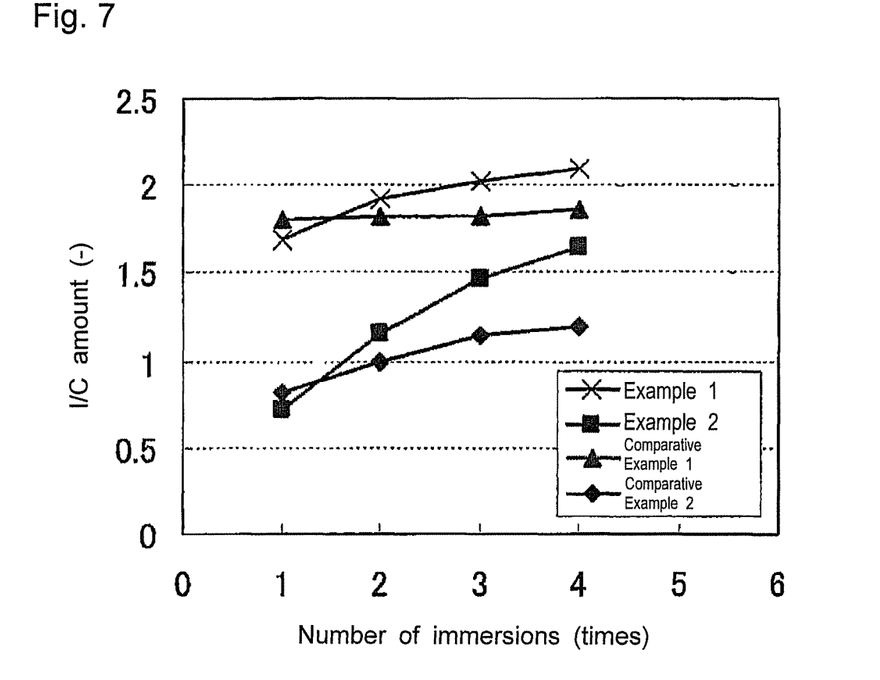
FIG. 7 is a graph showing the relationship between the number of immersions in an ionomer solution and the I/C amount, for ionomer-coated, catalyst-supporting CNTs of Examples 1 and 2 and Comparative Examples 1 and 2.

FIG. 7 is a graph showing the relationship between the number of immersions in the ionomer solution and the I/C amount, for the ionomer-coated, catalyst-supporting CNTs of Examples 1 and 2 and Comparative Examples 1 and 2. FIG. 7 is a graph with the I/C amount on the vertical axis and the number of immersions of the catalyst-supporting CNTs in the ionomer solution on the horizontal axis. Plotted "X" symbols indicate the data of Example 1. Plotted square symbols indicate the data of Example 2. Plotted triangle symbols indicate the data of Comparative Example 1. Finally, plotted rhombic symbols indicate the data of Comparative Example 2.

First, Example 1 is compared to Comparative Example 1. For Comparative Example 1, the I/C amount by the first immersion is 1.8. For Example 1, the I/C amount by the first immersion is 1.69. Accordingly, in the case of using the 8% solid content ionomer solution, 6% more ionomer can be saved than ever before, by preferentially removing the ionomer mainly attached to the tip end of the CNTs, by the method of the present invention.

For Comparative Example 1, the I/C amount by the second immersion, third immersion and fourth immersion are 1.82, 1.82 and 1.84, respectively. Therefore, it is clear that there is no increase in the I/C amount by the conventional method as Comparative Example 1, even if the CNTs are repeatedly coated with the ionomer. This suggests that excess ionomer mainly attached to the tip end of the CNTs by the first immersion, blocked the routes of ionomer infiltration; therefore, the ionomer cannot reach the base end of the CNTs, even by the subsequent repeated immersion. For Example 1, the I/C amount by the second immersion, third immersion and fourth immersion are 1.92, 2.02 and 2.09, respectively. For Example 1, as the number of repeated immersions increased, the I/C amount increased. At the time of completing the fourth immersion in the 8% solid content ionomer solution, the I/C amount of Example 1 is about 10% higher than the I/C amount of Comparative Example 1. This indicates that excess ionomer mainly attached to the tip end of the CNTs, can be removed by inclining the ionomer-coated, catalyst-supporting CNTs after taking out from the ionomer solution, or by immersing the ionomer-coated, catalyst-supporting CNTs in 100% ethanol after taking out from the ionomer solution; therefore, even in the case of using the ionomer solution with a relatively high solid content, more ionomer can reach the base end of CNTs, as the number of repeated immersions increases.

Next, Example 2 is compared to Comparative Example 2. For Comparative Example 2, the I/C amount by the first immersion is 0.823. For Example 2, the I/C amount by the first immersion is 0.722. Accordingly, in the case of using the 3.5% solid content ionomer solution, 12% more ionomer can be saved than ever before, by preferentially removing the ionomer mainly attached to the tip end of the CNTs, by the method of the present invention.

For Comparative Example 2, the I/C amount by the second immersion, third immersion and fourth immersion are 1.0, 1.15 and 1.2, respectively. Therefore, it is clear that in the case of using the 3.5% solid content ionomer solution, even though the CNTs are repeatedly coated with the ionomer, the I/C amount reaches the upper limit by the fourth immersion, according to the conventional method. This suggests that excess ionomer mainly attached to the tip end of the CNTs by repeating immersion three times, blocked the routes of ionomer infiltration; therefore, the ionomer became less likely to reach the base end of the CNTs, even by the fourth immersion. For Example 2, the I/C amount by the second immersion, third immersion and fourth immersion are 1.16, 1.46 and 1.65, respectively. For Example 2, therefore, as the number of repeated immersions increased, the I/C amount increased. At the time of completing the fourth immersion in the 3.5% solid content ionomer solution, the I/C amount of Example 2 is 1.4 times higher than the I/C amount of Comparative Example 2. This indicates that excess ionomer mainly attached to the tip end of the CNTs, can be removed by inclining the ionomer-coated, catalyst-supporting CNTs after taking out from the ionomer solution, or by immersing the ionomer-coated, catalyst-supporting CNTs in 100% ethanol after taking out from the ionomer solution; therefore, even in the case of using the ionomer solution with a relatively low solid content, more ionomer can reach the base end of CNTs, as the number of repeated immersions increases.

From the above, it is clear that by the production method of the present invention, the ionomer mainly attached to the tip end of the CNTs can be removed and the ionomer can reach the base end of the CNTs through the repeated immersion in the ionomer solution, regardless of the solid content.

3. Measurement of Ionomer Profiles

After drying the ionomer-coated, catalyst-supporting CNTs of Example 1 and Comparative Example 1, both of which comprising the 8% solid content ionomer solution, scanning electron microscopy energy dispersion X-ray spectrometry (hereinafter referred to as SEM-EDS) analysis was performed on the CNTs, by means of a scanning electron microscope, dividing the CNTs into seven layers (profiles) in a direction approximately parallel to the substrate, the layers (profiles) containing a layer (profile) of the interface between the substrate and the CNTs to a layer (profile) of the tip end of the CNTs.

Detailed SEM-EDS measurement conditions are as follows.

Figure 8:
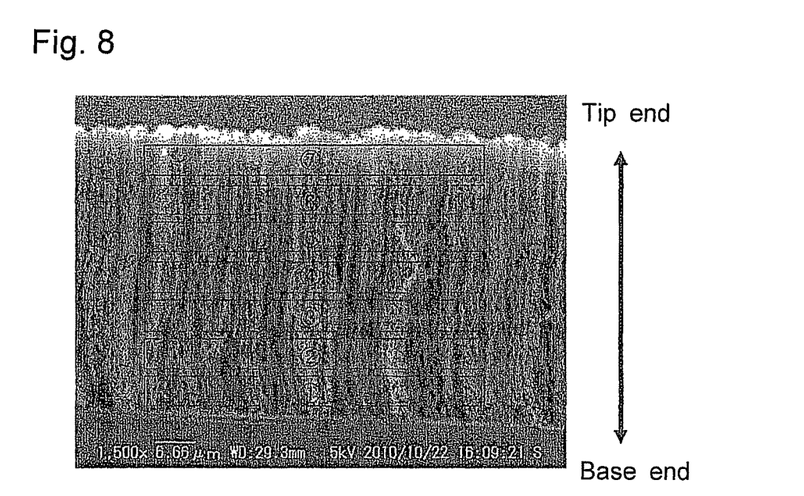
FIG. 8 is an SEM image of the profile of ionomer-coated, catalyst-supporting CNTs of Example 1.

Measurement system: scanning electron microscope (model: VE7800; manufactured by: Keyence Corporation)
Accelerating voltage: 5 kV
Magnification: 1,500 times FIG. 8 is an SEM image of the profile of the ionomer-coated, catalyst-supporting CNTs of Example 1. As shown in FIG. 8, SEM-EDS analysis was performed on the CNTs, dividing the CNTs into seven layers (profiles) in a direction approximately parallel to the substrate, the layers (profiles) containing a layer (profile) of the base end of the CNTs to a layer (profile) of the tip end of the CNTs. The base end of the CNTs, that is, the part which is closest to the substrate was regarded as the first layer (profile) and the tip end of the CNTs, that is, the part which is closest to the surface of the CNTs was regarded as the seventh layer (profile).

Figure 9:
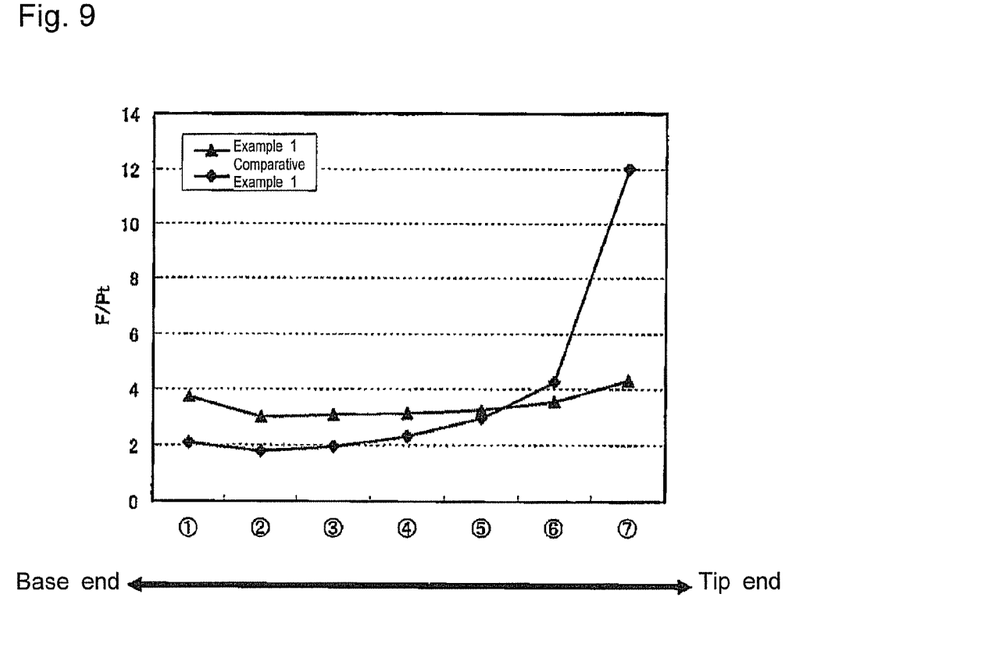
FIG. 9 is a graph showing the results of SEM-EDS analysis for Example 1 and Comparative Example 1.

FIG. 9 is a graph showing the results of the SEM-EDS analysis for Example 1 and Comparative Example 1. FIG. 9 is a graph with the F/Pt ratio on the vertical axis. "F/Pt ratio" is an indicator of the degree of ionomer coating, on the premise that platinum is evenly supported on the CNT surface, and it is also a ratio of the ionomer amount to the platinum amount obtained from the SEM-EDS analysis results. In FIG. 9, plotted triangle symbols indicate the data of Example 1, and plotted rhombic symbols indicate the data of Comparative Example 1.

As is clear from FIG. 9, in the sixth and seventh layers (profiles), the F/Pt ratio of the Comparative Example 1 is higher than that of Example 1. Particularly, while the F/Pt ratio of the seventh layer (profile) of Example 1 is 4.2, the F/Pt ratio of the seventh layer (profile) of Comparative Example 1 is 12, and Example 1 is three times higher than Comparative Example 1. On the other hand, as is clear from FIG. 9, in the first to fifth layers (profiles), the F/Pt ration of Comparative Example 1 is lower than that of Example 1. From the results, it has been confirmed that while, in the conventional method, the ionomer was excessively present at the tip end of the CNTs, the CNTs were almost evenly coated with the ionomer by the production method of the present invention, from the tip end to the base end thereof.

4. Production of Membrane Electrode Assembly

Example 3

A perfluorocarbon sulfonic acid polyelectrolyte membrane (trade name: Nafion) was used as the electrolyte membrane.

The ionomer-coated, catalyst-supporting CNTs of Example were transferred from the substrate to both sides of the electrolyte membrane, thus producing the membrane electrode assembly of Example 1. The transfer was performed under the conditions of a temperature of 140° C. and a pressure of 10 MPa. The transfer time was set to 30 minutes.

Comparative Example 3

The membrane electrode assembly of Comparative Example 3 was produced in the same manner as Example 3, except that the ionomer-coated, catalyst-supporting CNTs of Comparative Example 1 were used in place of the ionomer-coated, catalyst-supporting CNTs of Example 1.

5. Evaluation of Power Generation Performance of Membrane Electrode Assemblies

The membrane electrode assemblies of Example 3 and Comparative Example 3 were evaluated for their power generation performance. The evaluation conditions are as follows.

Figure 10:
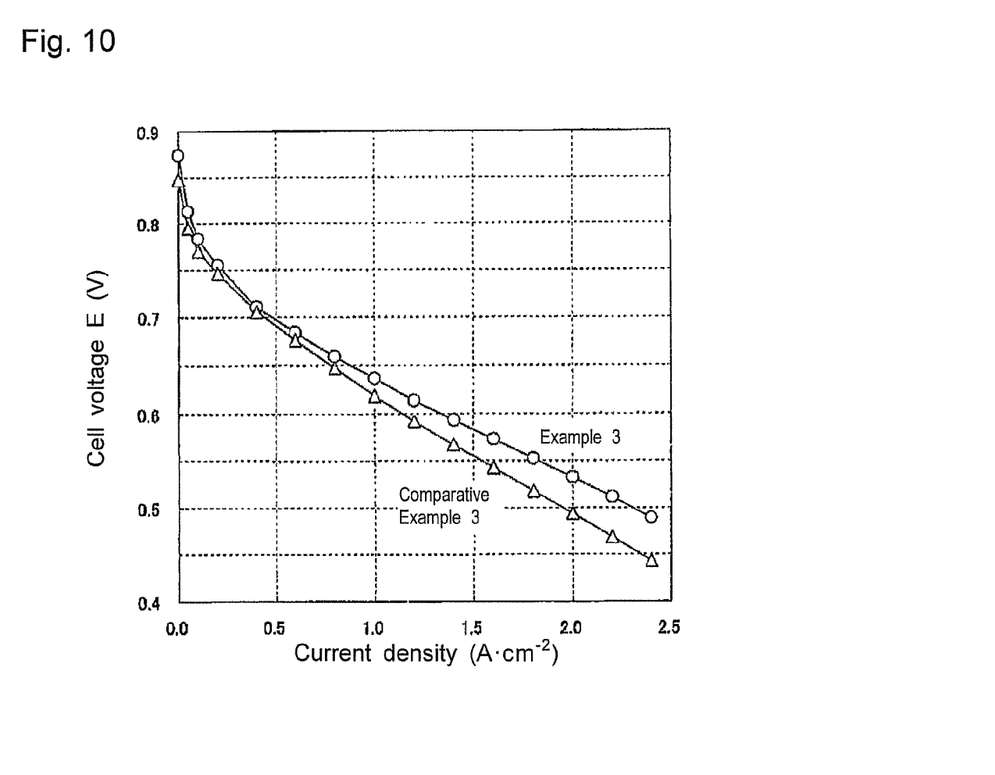
FIG. 10 shows the discharge curves of membrane electrode assemblies of Example 3 and Comparative Example 3.

Evaluation system: Water balance analysis system (manufactured by TOYO Corporation)
Humidification condition: No electrodes are humidified
Measurement temperature: 70° C.
Measurement potential: 1.0 to 0.4 V
Measurement current density: 0 to 2.4 A/cm$^2$ FIG. 10 shows the discharge curves of the membrane electrode assemblies of Example 3 and Comparative Example 3. FIG. 10 is a graph with the cell voltage E (V) on the vertical axis and the current density (A/cm$^2$) on the horizontal axis. In FIG. 10, plotted circle symbols indicate the data of Example 3, and plotted triangle symbols indicate the data of Comparative Example 3.

As is clear from FIG. 10, in a so-called high-load current region at 1.0 A/cm$^2$ or more, difference in voltage was observed between Example 3 and Comparative Example 3. For example, while the voltage of Comparative Example 3 at 2.0 A/cm$^2$ is 0.492 V, the voltage of Example 3 at 2.0 A/cm$^2$ is 0.538 V. Accordingly, it is clear that there is a difference in voltage of 46 mV between Example 3 and Comparative Example 3, at 2.0 A/cm$^2$. Such a difference in performance in the high-load current region indicates a difference in concentration overvoltage that is dependent on the ionomer-coated, catalyst-supporting CNTs. In particular, the fact that the voltage of Example 3 at 2.0 A/cm² is 46 mV higher than the voltage of Comparative Example 3 at 2.0 A/cm², indicates that the CNTs of Example 3 are more evenly coated with the ionomer than the CNTs of Comparative Example 3.

From the above, it has been proved that the membrane electrode assembly of Example 3, the assembly comprising the CNTs produced by the production method of the present invention, has an extremely higher discharge performance compared to the membrane electrode assembly of Comparative Example 3, the assembly comprising the CNTs produced by the conventional production method.

REFERENCE SIGNS LIST

1. Substrate
2. CNT
3. Catalyst
4. Ionomer
4a. Excess ionomer at the tip end of CNTs
5. Ionomer-coated, catalyst-supporting CNTs
6. Heat source
7. Rotation axis
8. Highly hydrophilic material
9. Spaces between CNTs
20. Vertical direction
21. Substrate
22. CNT
23. Catalyst
24. Ionomer
24a. Excess ionomer at the tip end of CNTs
25. Ionomer-coated, catalyst-supporting CNTs produced by the conventional method
29. Spaces between CNTs
30. Direction of own weight of ionomer
40 Direction of centrifugal force applied to ionomer
50 Direction of wind

The invention claimed is:

1. A method for producing ionomer-coated, catalyst-supporting carbon nanotubes,
the method comprising:
a step of preparing catalyst-supporting carbon nanotubes on at least one surface of a substrate, the nanotubes being aligned approximately perpendicular to the plane direction of the substrate;
a step of preparing a first ionomer solution;
an ionomer coating step of bringing the catalyst-supporting carbon nanotubes into contact with the first ionomer solution and coating the catalyst-supporting carbon nanotubes with the ionomer; and
a drying step of drying the ionomer-coated, catalyst-supporting carbon nanotubes,
a process containing a set of steps from the ionomer coating step to the drying step, is performed at least one time,
wherein the method comprises an ionomer removal step in which, a distribution of the amount of ionomer attached to the base and to the tip end of the ionomer-coated, catalyst-supporting carbon nanotubes is uneven such that an excess amount of ionomer is located at the tip end of the carbon nanotubes, wherein the excess ionomer that is found in and attached to the tip end of the carbon nanotubes rather than other parts thereof, is removed after the ionomer coating step and before the drying step; and
wherein the first ionomer solution has a solid content of 10% or less.

2. The method for producing ionomer-coated, catalyst-supporting carbon nanotubes according to claim 1, wherein the ionomer removal step uses at least one method selected from the group consisting of a method of using heat, a method of using a gravitational force, a method of using an inertial force, a method of using a wind force, and a method of using a surface tension.

3. The method for producing ionomer-coated, catalyst-supporting carbon nanotubes according to claim 2, wherein the method of using heat is a method in which the excess ionomer that is found in and attached to the tip end of the carbon nanotubes rather than other parts thereof, is burned off by heating the tip end side of the ionomer-coated, catalyst-supporting carbon nanotubes with at least one heating means selected from the group consisting of laser and heat ray.

4. The method for producing ionomer-coated, catalyst-supporting carbon nanotubes according to claim 2, wherein the method of using a gravitational force is a method in which the excess ionomer that is found in and attached to the tip end of the carbon nanotubes rather than other parts thereof, is removed by inclining the plane direction of the substrate at an angle θ (0°≤θ<90°) with respect to the vertical direction.

5. The method for producing ionomer-coated, catalyst-supporting carbon nanotubes according claim 2, wherein the method of using an inertial force is a method in which the excess ionomer that is found in and attached to the tip end of the carbon nanotubes rather than other parts thereof, is shaken off by at least one selected from the group consisting of shaking the ionomer-coated, catalyst-supporting carbon nanotubes and rotating the ionomer-coated, catalyst-supporting carbon nanotubes.

6. The method for producing ionomer-coated, catalyst-supporting carbon nanotubes according to claim 2, wherein the method of using a wind force is a method in which the excess ionomer that is found in and attached to the tip end of the carbon nanotubes rather than other parts thereof, is blown off by applying a wind to at least the tip end side of the ionomer-coated, catalyst-supporting carbon nanotubes.

7. The method for producing ionomer-coated, catalyst-supporting carbon nanotubes according to any one of claim 2, wherein the method of using a surface tension is a method in which the excess ionomer that is found in and attached to the tip end of the carbon nanotubes rather than other parts thereof, is infiltrated into a hydrophilic material by bringing the material into contact with the tip end side of the ionomer-coated, catalyst-supporting carbon nanotubes, and then is removed.

8. The method for producing ionomer-coated, catalyst-supporting carbon nanotubes according to claim 1, the method comprising a step of weakening an adhesion of the ionomer to the carbon nanotubes than the adhesion that the ionomer had at the time of the ionomer coating step, after the ionomer coating step and before the ionomer removal step.

9. The method for producing ionomer-coated, catalyst-supporting carbon nanotubes according to claim 8, wherein the step of weakening the adhesion of the ionomer is a step in which the ionomer-coated, catalyst-supporting carbon nanotubes are brought into contact with at least one of an organic solvent and a second ionomer solution that has lower ionomer concentration than the first ionomer solution.

* * * * *